United States Patent
Nothhelfer et al.

(10) Patent No.: US 6,354,142 B1
(45) Date of Patent: Mar. 12, 2002

(54) PROCESS FOR TESTING THE TIGHTNESS OF PACKAGES

(75) Inventors: Markus Nothhelfer, Kerpen; Ingo Seckel, Bruhl, both of (DE)

(73) Assignee: Leybold Vakuum GmbH (DE)

( * ) Notice: Subject to any disclaimer, the term of this patent is extended or adjusted under 35 U.S.C. 154(b) by 0 days.

(21) Appl. No.: 09/269,966

(22) PCT Filed: Aug. 13, 1997

(86) PCT No.: PCT/EP97/04423

§ 371 Date: Apr. 8, 1999

§ 102(e) Date: Apr. 8, 1999

(87) PCT Pub. No.: WO98/16809

PCT Pub. Date: Apr. 23, 1998

(30) Foreign Application Priority Data

Dec. 12, 1997 (DE) .......................... 196 42 099

(51) Int. Cl.⁷ .............................. G01M 3/22; G01M 3/32
(52) U.S. Cl. ...................................... 73/49.3; 73/40.7
(58) Field of Search .................. 73/40.7, 49.2, 73/49.3

(56) References Cited

U.S. PATENT DOCUMENTS

| 3,027,753 A | 4/1962 | Harder, Jr. | |
| 3,813,923 A | 6/1974 | Pendleton | 73/49.2 |
| 4,055,984 A | 11/1977 | Marx | |
| 4,584,877 A * | 4/1986 | Brayman | 73/40.7 |
| 4,593,554 A | 6/1986 | Aarts | 73/49.3 |
| 5,068,074 A * | 11/1991 | De Rego | 264/257 |
| 5,199,296 A | 4/1993 | Lehmann | |
| 5,373,729 A * | 12/1994 | Seigeot | 73/49.3 |
| 5,513,516 A | 5/1996 | Stauffer | 73/49.2 |

FOREIGN PATENT DOCUMENTS

| EP | 0152981 | 8/1985 | 73/49.3 |
| FR | 2319891 | 2/1977 | |
| GB | 1238276 | 7/1971 | |
| JP | 62-112027 | * 5/1987 | 73/49.2 |
| JP | 07-325006 | 12/1995 | 73/49.2 |

* cited by examiner

Primary Examiner—Daniel S. Larkin
(74) Attorney, Agent, or Firm—Wall, Marjama & Bilinski, LLP

(57) ABSTRACT

A process is disclosed for testing the tightness of a package (11) containing a packaged object (10) and in which a test gas is contained; leak testing is performed in such a manner that the packaged object (10) is introduced into a test chamber formed by two extensible foils (2, 3) and where the space between the foils (2, 3), in which the packaged object is contained, is evacuated in such a manner that the foils (2, 3) can wrap the packaged object (10); at least in the areas of their surfaces which face the packaged object (10) and in which the tightness of the package (11) is to be inspected, the foils (2, 3) are provided with means (12) which form a coherent intermediate space (13) over the areas to be inspected of the package (11); the intermediate space (13) is evacuated down to a pressure lower than the pressure within the package (11); the evacuated intermediate space (13) is connected to a detector (30) sensitive to the test gas to determine if test gas escapes outwards through the inspected area of the package (11).

3 Claims, 2 Drawing Sheets

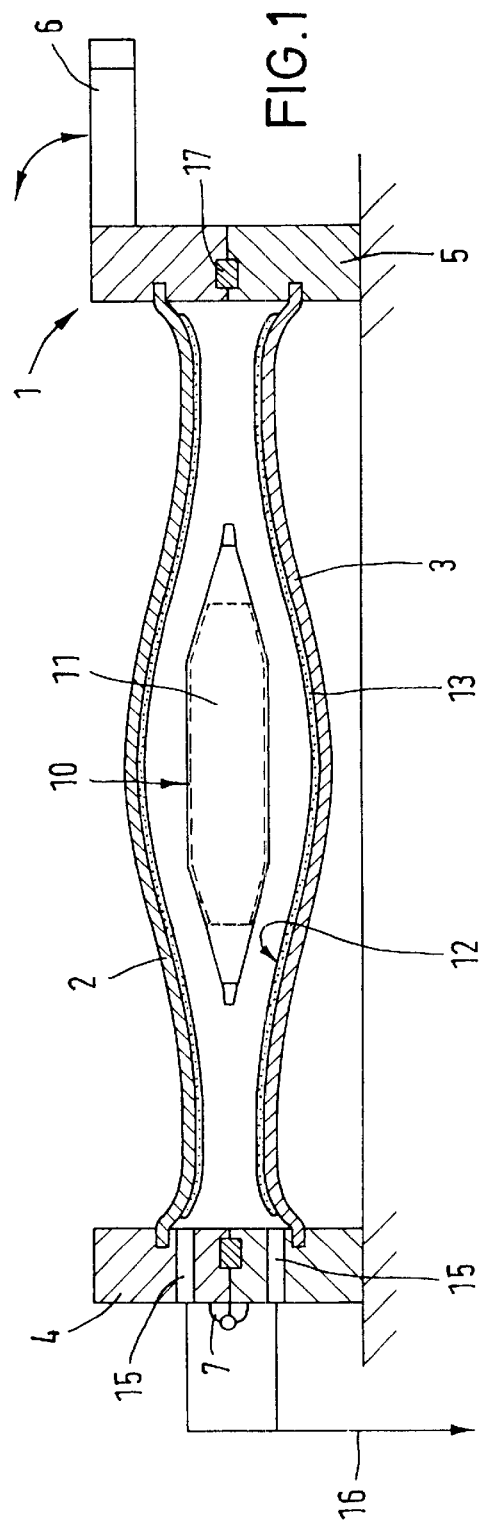
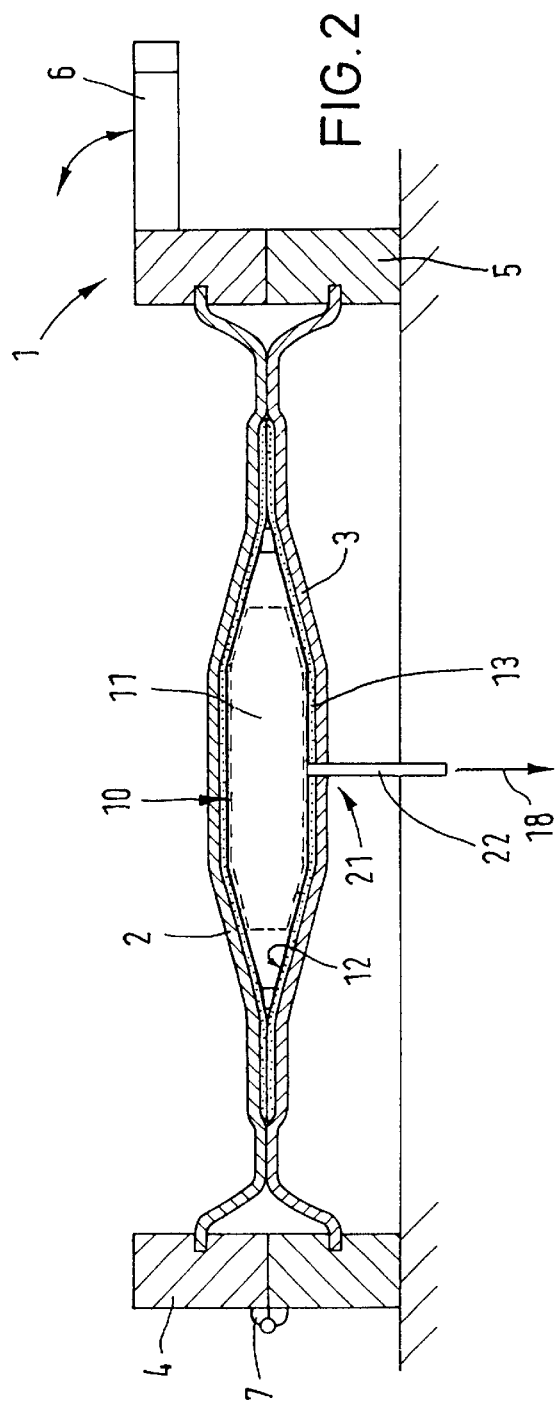

PROCESS FOR TESTING THE TIGHTNESS OF PACKAGES

BACKGROUND OF THE INVENTION

The present invention relates to a process and a facility for testing the tightness of the package for a packaged object.

Food stuffs, pharmaceuticals, objects used in the area of medicine like, for example, disposable items, etc. are generally contained in a package (foil, bottle or sealed ampoules, and alike). It is the purpose of this package to protect the packaged object against any contamination from the outside. In the case of food stuffs, the package frequently serves the additional purpose of avoiding a loss of flavour in the packaged goods. These and other objectives can only be fulfilled by the selected package if it provides a hermetically tight seal.

SUMMARY OF THE INVENTION

It is the task of the present invention to create a process and a facility through which the tightness of a package for a packaged object may be checked easily, quickly, and reliably.

In the process according to the present invention, it is required that a test gas be contained within the package. For example, this may be a protective gas for the packaged goods (for example, nitrogen, argon, carbon dioxide, or alike). An other possibility is to ensure, in the course of the packaging process, that a typical test gas, like helium, is introduced into the package. It is essential that a detector is in a position to discern between the test gas present in the package of the packaged object and air. It is particularly advantageous when the package contains a share of helium gas amounting to 5 to 25%, by volume and preferably 10% by volume.

The tightness of the package is inspected according to the present invention by introducing the packaged object into a test chamber formed by two extensible foils, so that the space between the foils in which the packaged object is contained, is evacuated in such a manner that the foils can wrap the packaged object. At least in the areas of their surfaces which face the packaged object and in which the tightness of the package is to be inspected, the foils are provided with a layer of material which form a coherent intermediate space over the areas of the package which are to be inspected. This intermediate space is evacuated down to a pressure lower than the pressure within the package. The evacuated intermediate space is connected to a detector sensitive to the test gas to determine if test gas escapes outwards through the inspected area of the package.

A special advantage offered by the process according to the present invention is, that the test chamber will always adapt itself to the shape of the test object, resulting in a minimum volume which may be rapidly evacuated. Moreover, a test chamber of this kind is of greater simplicity and lighter in weight compared to known leak testing chambers which, for reasons of their ability to resist pressures, need to be designed to be sufficiently stable. Finally, the areas of the foil resting against the package offer a means of protection for the package. Even highly sensitive packages may be exposed to a relatively high pressure difference, this pressure difference having a decisive influence on the sensitivity of the leak testing process.

BRIEF DESCRIPTION OF THE DRAWINGS

Further advantages and details of the present invention shall be explained by reference to the schematically depicted design examples of drawing FIGS. 1 to 4 relating to a facility for implementing leak tests on packages.

Depicted in drawing FIGS. 1 to 3 are in each case sections through the frame constructions 1 with the foils 2 and 3 attached within. Depicted in drawing

DESCRIPTION OF THE INVENTION

Figure 3:
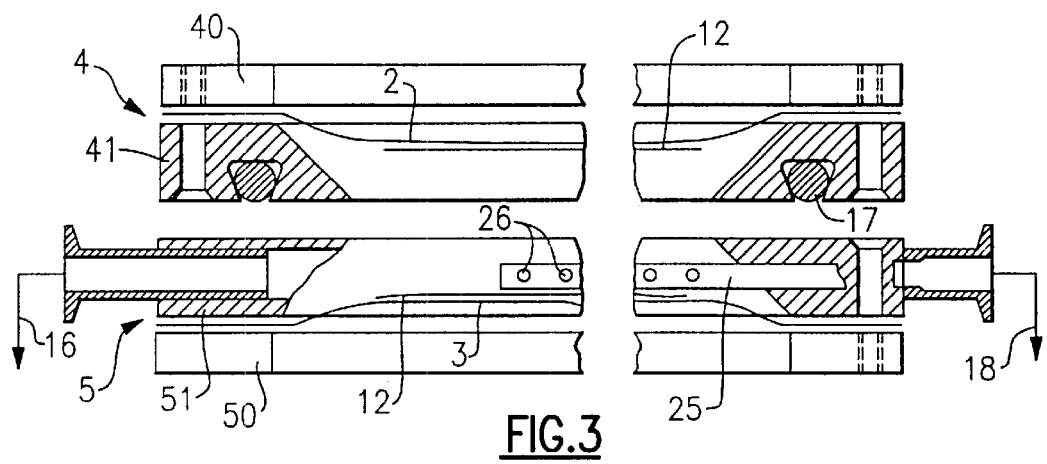

The frame constructions 1 according to drawing FIGS. 1 to 3 comprise in each case two open frames 4 and 5 in which the foils 2 and 3 are affixed, in particular clamped, in such a manner that they extend essentially in parallel to each other. The upper frame 4 may be lifted with the aid of handle 6. It is expedient that the frames 4, 5 be linked to each other by means of a hinge 7 (drawing FIGS. 1,2).

In the design examples according to drawings FIGS. 1 and 2, an object 10 is contained within package 11, the tightness of which is to be inspected, is located between foils 2 and 3. The areas of the foils 2, 3 facing the object 10 are provided with layers 12 which ensure the presence of a coherent intermediate space 13 between the foils 2, 3 and the package 11. These layers 12 may be separate pieces of mesh, porous foils, sintered foils, or also napped foils. Also, the foils 2, 3 themselves may be equipped with naps. Finally, there exists the possibility of employing foils which are porous on the side facing the package.

In order to form the test chamber necessary for leak testing the package, the space between the foils 2, 3 is evacuated. Thereby, foils 2,3 can wrap the object 10 and create a test chamber which comprises intermediate space 13 formed by layer or layers 12 and the volume of the packaged object 10. Generated in the test chamber is a pressure which is sufficiently low to let, in the case of the presence of a leak, the test gas contained in the package to escape. The possibly present partial vacuum (vacuum packages) needs to be taken into account here. The test gas is detected, in a manner which is basically known, by a detector sensitive to the test gas, said detector being connected to intermediate space 13/test chamber.

In the design example according to drawing FIG. 1, the evacuation is performed through bores 15 in one or both frames 4 and 5 as well as through the connected line 16. The layers 12 forming intermediate space 13 extend into the edge regions of foils 2, 3 so that any possibly escaping test gas may pass through the bores 15 into line 16 to which the detector sensitive to the test gas is also connected. Seal 17 between the frames 4, 5 is provided for the purpose of sealing off the test chamber to the outside.

In the design example according to drawing FIG. 2, the test chamber is evacuated through a central connection 21, which may, for example, be designed as a hose connection 22 and which is linked to line 18. The layers 12 forming intermediate space 13 do not extend into the edge regions of foils 2, 3 so that the outer seal of the test chamber is effected by the edge regions of the foils 2, 3 coming into direct contact with each other as the evacuation process commences. Further evacuation and the inspection for the presence of leaks is performed through the connection 21.

For reasons of faster evacuation and/or safety, it may be expedient to provide also in the design example according to drawing FIG. 2, a seal 17 for the frame and means for evacuating the outer edge region, as detailed in connection with drawing FIG. 1. A connection of line 16 to the detector will then not be required.

In the design example according to drawing FIG. 3, the frames 4, 5 each consist of two sections (frame sections 40, 41 and 50, 51 respectively). Clamped between the corresponding sections of the frame 40, 41 and 50, 51 respectively, are foils 2, 3. The layers 12 serving the purpose of forming the intermediate space 13 are only indicated by lines. In order to ensure, for the objects enclosed between the foils 2, 3, the presence of a link between the test chamber and a detector, a tube 25 having bores 26 is present which extends from edge region 5 into the test chamber.

After having performed an inspection, the test chamber is vented so that the frames 4, 5 are detached from each other and so that the inspected object may be removed. It depends on the size of the foils 2, 3 and the size of the packaged objects, whether the packages of several objects may be inspected simultaneously.

The layers 12 serving the purpose of forming the intermediate space 13 determine the location of the inspection. Thus, there exists the possibility of restricting the leak test to relevant areas, in the case of ampoules, for example, only to the area of the seals. The remaining area of an ampoule may for example form, together with the tightly fitting foils 2, 3, the outer seal for the test chamber. Also, single sided inspection of an object (for example, testing the tightness of a lid for a dish) is possible. In such a case, only one of the two foils 2, 3 needs to be equipped with the layers 12.

The foils used in connection with the present invention should be, at a thickness of 0.4 mm, extremely elastic (elongation at tear 400 to 600%) and extremely tear resistant (30 to 50 MPa). Foils of this kind have the ability of adapting themselves even to the shape of sharp-edged test objects without suffering permanent deformation. Foils of this kind are known on the market under the name PLATILON (trade mark of the company "elf atochem" Germany GmbH). These are polyester or polyether urethane foils. They permit the desired leak testing process to be performed at sensitivities below $1 \times 10^{-4}$ mbar l/s and this at a test duration of a few seconds.

Figure 4:
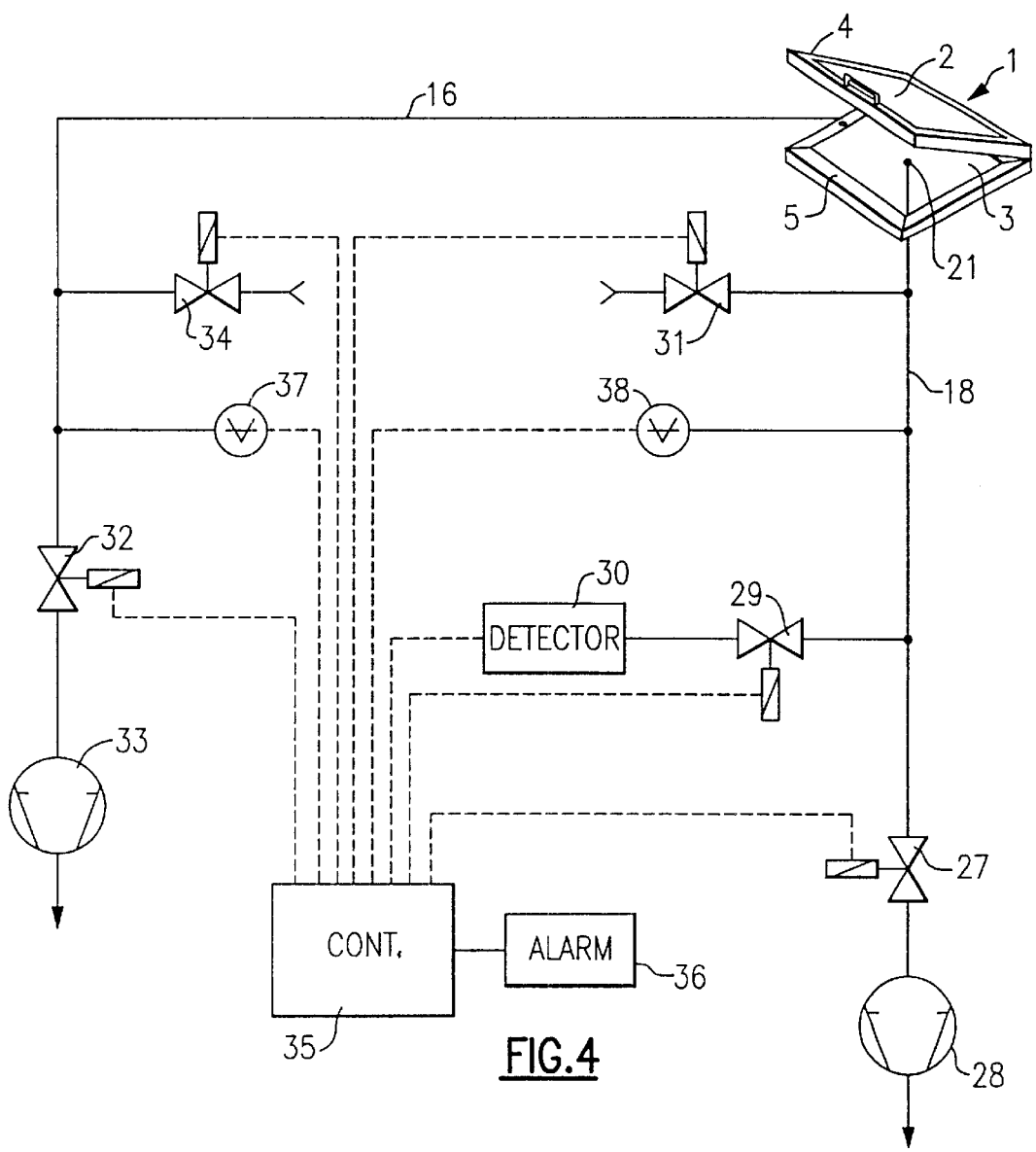
FIG. 4 is a schematic for the means necessary to operate a leak testing facility according to the present invention.

Depicted schematically in drawing FIG. 4 are the facilities required to perform a leak test. A frame construction 1 has been selected, having a central connection 21 to evacuate the test chamber and to connect it to a test gas detector. Moreover, line 16 (c.f. drawing FIG. 1) is present, through which the areas at the edge are evacuated.

Connected to the central connection 21, is the line 18 which is linked via valve 27 to the vacuum pump 28, and via valve 29 to the detector 30. The test chamber can be vented via valve 31. Line 16 is linked via valve 32 to the vacuum pump 33. It can be vented via valve 34.

The inspection process is performed automatically. For this, a control unit 35 with a warning/alarm generator 36 is provided. Pressure sensors 37 and 38 which monitor the pressure in the lines 16, 18 are provided for pressure-dependent control processes.

Inspections using the facilities according to drawing FIG. 4 are performed in a manner where the object to be inspected is first placed on the foil 3 and the frame 1 is closed. All valves are closed. By opening valves 27 and 32, the test chamber wrapping the packaged object is formed and the area of the edges is evacuated. In the test chamber, a pressure of about one mbar is already attained over a short time permitting the detector 30 to be cut in (opening of the valve 29). The detector 30 is preferably a mass spectrometer, which has been adjusted to the test gas (which also may consist of a special gas mixture). If the package has a leak, the test gas will be recorded. The warning/alarm generator 36 is activated by the control unit 35. After completion of the actual leak test, the valves 27, 29, 32 are closed and venting valves 31, 34 are opened, so that the inspected object may be taken out of the frame for construction 1.

What is claimed is:

1. Apparatus for detecting a leak in a sealed package containing a test gas, said apparatus including:

a first flat planar frame having side walls defining the periphery of a first opening and a first extendable foil sheet secured in said first frame about the entire periphery of said first opening to completely fill said first opening;

a second flat planar frame having side walls defining the periphery of a second opening and an extendable foil sheet secured in said second frame about the entire periphery of the second opening to completely fill said second opening;

said extendable foil sheets being formed of a polyurethane material having a tear resistance of about 30 to 50 MPs and an elongation at tear of about 400% to 600%;

means to close one frame against the other to enclose a sealed package containing helium gas inside said frames between the first and second foil sheets;

means to draw a vacuum between the first and second foil sheets sufficient to bring the sheets together and wrap the sheets around the package to minimize the space between the sheets and the package; and sensing layers for detecting the presence of helium in the space between the foil sheets and the package.

2. The apparatus of claim 1 wherein each foil sheet contains an inner liner that forms a coherent intermediate space between the sheet and the package when the sheet is wrapped about the package.

3. The apparatus of claim 2 wherein the inner liner is formed of a material selected from a group of materials consisting of a mesh material, a porous material, a sintered material or a napped material.

* * * * *

UNITED STATES PATENT AND TRADEMARK OFFICE
CERTIFICATE OF CORRECTION

PATENT NO. : 6,354,142 B1
DATED : March 22, 2002
INVENTOR(S) : Nothhelfer et al.

It is certified that error appears in the above-identified patent and that said Letters Patent is hereby corrected as shown below:

<u>Title page,</u>
Item [30], Foreign Application Priority Data,
Oct. 12, 1996   (DE) …………………….. 196 42 099.7

Signed and Sealed this

Twenty-seventh Day of August, 2002

Attest:

Attesting Officer

JAMES E. ROGAN
*Director of the United States Patent and Trademark Office*